United States Patent [19]

Ballas et al.

[11] 3,859,776

[45] *Jan. 14, 1975

[54] ROTARY CUTTING ASSEMBLY

[75] Inventors: George C. Ballas, Thomas N. Geist, both of Houston, Tex.

[73] Assignee: Weed Eaters, Inc., Houston, Tex.

[ * ] Notice: The portion of the term of this patent subsequent to Jan. 9, 1990, has been disclaimed.

[22] Filed: Apr. 5, 1973

[21] Appl. No.: 347,997

Related U.S. Application Data

[63] Continuation-in-part of Ser. No. 321,580, Jan. 8, 1973, , which is a continuation-in-part of Ser. No. 207,198, Dec. 13, 1971, Pat. No. 3,708,967.

[52] U.S. Cl. .................................. 56/12.7, 56/295
[51] Int. Cl. ......................................... A01d 55/18
[58] Field of Search ............................. 56/12.7, 295

[56] References Cited
UNITED STATES PATENTS
3,708,967  1/1973  Geist .................................. 56/12.7

FOREIGN PATENTS OR APPLICATIONS
6,919,841  5/1969  Germany ............................. 56/295

Primary Examiner—Louis G. Mancene
Assistant Examiner—J. N. Eskovitz
Attorney, Agent, or Firm—Bard & Springs

[57] ABSTRACT

Apparatus is provided for cutting, trimming and edging vegetation and the like. A rotatable head assembly is provided with one or more non-metallic flexible lines extending peripherally to form flail-like cutting means. The head assembly is rotated in a cutting plane by an electric motor capable of swinging the ends of such lines within a preselected range of optimum tip velocities, and is further provided with means for distributing the shock of any impact received by such lines during backlash about the periphery of the head assembly.

19 Claims, 8 Drawing Figures

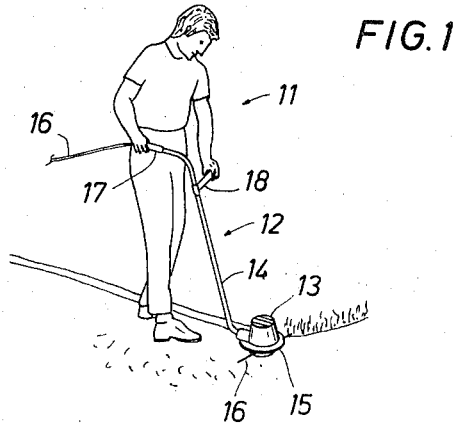
FIG. 1
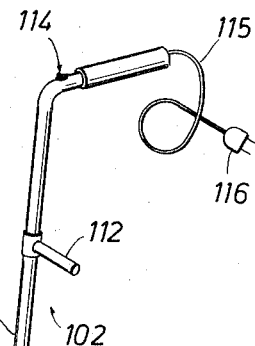
FIG. 2
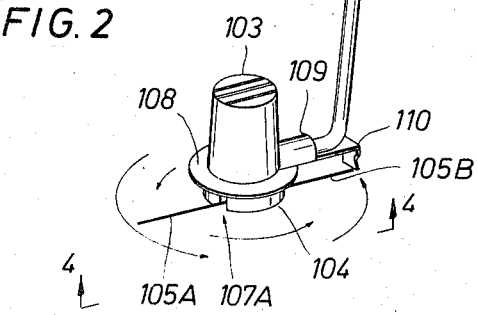
FIG. 3
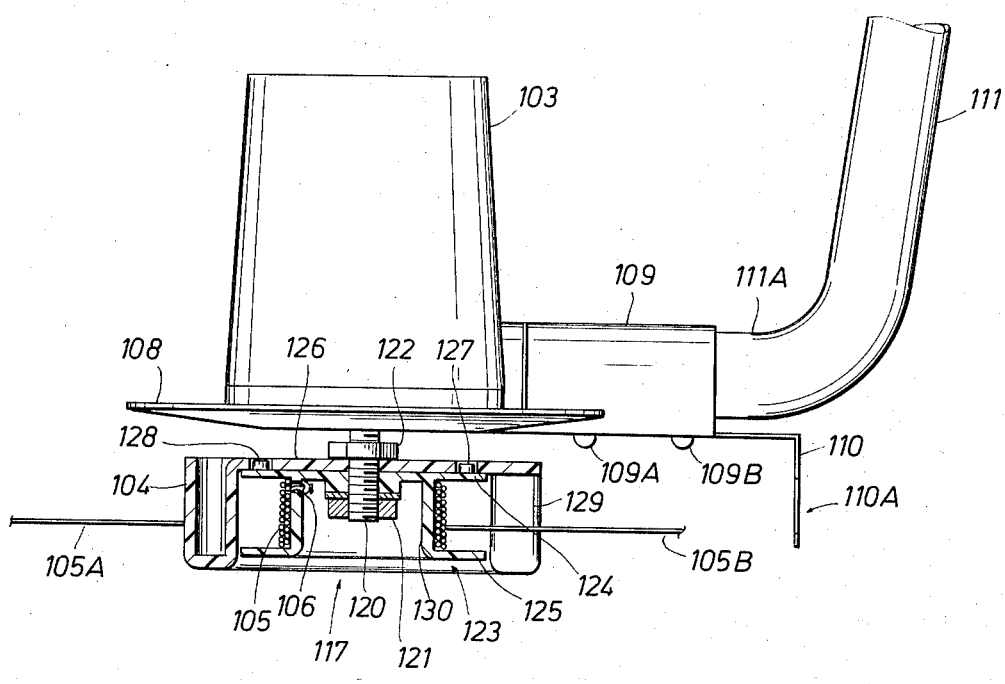

ROTARY CUTTING ASSEMBLY

RELATED PATENT APPLICATIONS

This is a continuation-in-part of a co-pending U.S. patent application Ser. No. 321,580, filed Jan. 8, 1973, which, in turn, is a continuation-in-part of a co-pending patent application Ser. No. 207,198, filed Dec. 13, 1971, which issued Jan. 9, 1973, as U.S. Pat. No. 3,708,967.

BACKGROUND OF INVENTION

This invention relates to an improved cutting assembly in the form of a rotary head for a rotary lawn mower, edger, trimmer or the like. The preferred embodiments are in the form of portable hand-held type lawn mowing and edging tools wherein the cutting element is safe in most uses and avoids the hazardous conditions created by prior art devices.

The prior art is prolix with attempts at solutions to provide a safe, efficient, and simply constructed rotary head for rotary lawn mowers, edgers, trimmers and the like. Heretofore, the rotary head, or cutting blade, of rotary lawn mowers, edgers, and the like, have comprised a rotating metal bar or the like which is rotated at sufficient speeds to effect cutting of grass, weeds, or the like. However, such bars create hazardous conditions in that when they strike certain objects they act those objects in a fashion to create and project dangerous missiles which may strike the operator or individuals in the area of work.

Various attempts have been made to overcome the aforesaid hazardous conditions created with rigid type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following west German petty Patents No. 6,919,841, No. 6,919,842, No. 6,919,843, No. 6,919,844, No. 6,938,265 and No. 7,043,648 one or more embodiments of a lawn mowing or trimming device having a disc-like head member arranged to be rotated by an electric motor, and containing a spool which is housed therein in coaxial relationship to the shaft of the motor. A length of flexible nonmetallic line is coiled about the spool, whereby its free traveling end extends generally peripherally from the spool and head, and whereby such free traveling end will be swung arcuately about upon actuation of the motor to cut adjacent vegetation in the manner of a flail.

Use of the German device has revealed that, under ideal operating conditions, it will cut or trim grass and other light-weight vegetation with reasonable effectiveness. Furthermore, it possesses the significant advantage that it is much safer to use than the more conventional cutters, in that it does not cause stones or other solid objects to be discharged in the same dangerous manner, and it is almost completely incapable of causing any significant injury to persons or pets struck by the flailing cutting string. In fact, it is a reasonable statement that the German device will actually cut substantially only the vegetation to which it is directed.

On the other hand, the German device is also subject to certain disadvantages of a magnitude such as to severely limit if not destroy its practical value. In the first place, it is largely effective to cut standing light-weight vegetation but is almost completely useless for any other task. In the second place, it will only cut such vegetation if growing relatively sparsely, and it cannot effectively handle even light-weight vegetation if encountered in a rank condition. A more serious disadvantage, however, is that in the German device the cutting string experiences a breakage rate which is so high as to nullify all of its advantages and to keep such a device from having much commercial value.

It will be readily apparent from a consideration of the teachings hereinafter provided that a cutting string which is free from internal flaws or other defects will not usually break except as a result of being struck against or across a relatively immovable object. The cutting string may, of course, be formed of a metal wire or heavy strap in order to provide it with a tensile strength sufficient to resist such impact, but such a string will create substantially the same dangerous conditions which exist when the cutting element is a rigid blade or the like. Thus, the safety advantages which are present with the German device are directly derived from the same design feature which is the reason for excessive string breakage, i.e., the fact that the cutter used by the German device is a light-weight plastic cutting line having a relatively small diameter, and therefore relatively incapable of cutting any but the lightest and sparsest vegetation.

The disadvantages of the prior art, and especially the aforementioned German device, are overcome with the present invention, and commercially acceptable embodiments of a vegetation cutter and the like are herein provided which are not only fully capable of cutting vegetation under most operating conditions, but which are also fully capable of other tasks completely beyond the capabilities of the German device, such as cleaning dead leaves, trash and other such debris from along fences, walls, and the trunks or stems of trees and bushes. More particularly, however, the embodiments of the present invention are capable of operation with a much lower breakage rate for their cutting strings, without any sacrifice whatsoever of the safety features and advantages hereinbefore accorded to the aforementioned German cutting device.

SUMMARY OF INVENTION

This invention is for an improved cutting assembly for use as a rotary lawn mower, edger, trimmer or the like. It includes a body member arranged for rotation about an axis generally perpendicular with or normal to the cutting plane. It preferably includes at least two nonmetallic cutting lines attached to the body member for rotation therewith in the cutting plane, although a single line may be effective for present purposes under proper circumstances. Each line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is at least 20:1. Certain embodiments of the invention include means for detachably securing the line or lines to the body member so that the same may be replaced after wear. Means may also be included with the body member for storing supplies of line in the nonworking condition whereby the effective working length of the line or lines may be lengthened at desired times as the working length becomes shortened during use thereof. Certain embodiments of the invention may have line storage means supported in the body member, which storage means are in the form of spools which are locked from rotation, but which may be released so that additional line may be payed out as the effective working length becomes shortened during use. Another particularly significant feature is that the configuration of the cutting head is such as to prevent angular deformation of "kinking" of the cutting lines, as will hereinafter be explained in detail.

In one particularly ideal embodiment of the present invention, a circular head member is provided which contains a single spool located concentrically therein in coaxial alignment with the motor shaft, the spool having a single cutting strand centrally wound thereabout so as to present two free traveling ends extending oppositely of each other from the periphery of the head assembly. Alternatively, a pair of two separate strands may be wound about the spool to present the two ends as cutting members extending oppositely of each other from the periphery of the head assembly.

In its broadest concept, any type of motor may be employed for purposes of the present invention to rotate either of the aforementioned two styles of head assemblies. However, an electric motor is cheaper and of lighter weight than a gasoline-driven engine and is therefore far more suitable for a cutting device intended to be employed in residential-size plots or areas, and the like, wherein lesser cutting capabilities are normal required. Accordingly, it is a feature to employ an electric motor having particular characteristics especially suitable for such purposes.

As will hereinafter be explained in detail, another advantageous feature is that the cutting head, regardless of its configuration, will preferably include provision for at least two line bearing surfaces aligned with the axis of rotation of the head and spaced therefrom within the cutting plane defined by such rotation. The cutting line is stored concentrically in the head in cutting form, whereby a portion may be unwound as desired and extended peripherally from the head for cutting vegetation in the manner of a flail. It should be noted, however, that this unwound portion lies entirely within the cutting plane while the head is rotated, whereas this is definitely not the case with either the apparatus depicted in the aforementioned German patents or the other prior art hereinbefore mentioned, whereby the shock of impact on vegetation and so forth is better conducted and dispersed along the entire length of the extended portion of the cutting line.

Not only does the unwound portion of the cutting line in the German patents follow a tortuous path, from the coil to the outer perimeter of the housing, it should also be noted that, as hereinbefore explained, it is pinched or wedged between two adjacent tooth-like projections located on such perimeter. As will hereinafter be illustrated in detail, the cutting line in the present invention is disposed to normally bear on only one abutting surface in the housing, and this surface precedes rather than trails the cutting line as the head revolves in the cutting plane. Thus, the shock of impacts on the cutting line is much less prone to be concentrated at any single point along the cutting line, which is another reason why breakage does not occur with the same high frequency as has been the experience with apparatus of the type depicted in the German patents. Also, when the cutting line is retarded by encountering an obstruction, the leading surface moves away from the line before the trailing surface moves into bearing engagement with the line, whereupon the line will again bear on only one supporting surface when the shock of impact is received.

In summary, therefore, it is a feature of the present invention to provide cutting means of the type hereinbefore described with an electric motor which is capable of rotating the head of the cutting means at velocities such that the cutting lines will effectively cut weeds, grass and grass-like vegetation occurring in moderate abundance or density.

It is also a feature to provide a rotatable cutting means with one or more flexible non-metallic line means, and with an electric motor for swinging such line means at a tip velocity functionally related to their free traveling lengths and their cross-sectional diameter.

It is further a feature of the present invention to provide a length of non-metallic flexible line having one end coiled about the axis of rotation of a cutting plane and the other end extending tangentially therefrom in said cutting plane, electrically-actuated means for revolving said coiled portion of said line about said axis to impart a tip velocity to said extended end of at least a minimum preselected velocity and not greater than a maximum preselected velocity, and means for receiving said extended end and linearly distributing the shock of any impact received thereby.

It is also a feature to provide an electrically rotatable cutting assembly having one or more non-metallic flexible line members with free traveling ends extending peripherally therefrom, and further having provision for maintaining a generally curvilinear configuration of said ends during any backlash about the periphery of said cutting assembly.

These and other features and advantages of the present invention will become apparent from the following detailed description, wherein reference is made to the figures in the accompanying drawings.

IN THE DRAWINGS

FIG. 1 is a view showing an operator operating one form of portable cutting apparatus having cutting strings extending peripherally from a rotating circular head assembly or the like.

FIG. 2 is a larger pictorial representation of the cutting apparatus depicted in FIG. 1, wherein the mechanical feature and configuration of the apparatus are illustrated in greater detail.

FIG. 3 is a pictorial side view, partly in cross section, of a portion of the apparatus depicted in FIGS. 1 and 2.

DETAILED DESCRIPTION

Figure 4:
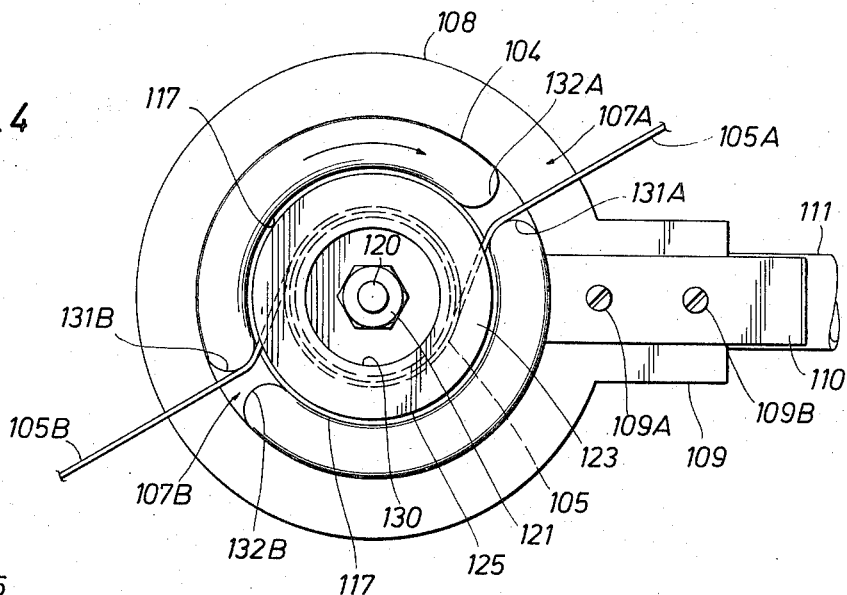
FIG. 4 is a pictorial bottom view of the apparatus depicted in FIG. 3.

Referring now to FIG. 1, an operator 11 is shown carrying a portable type lawn mowing edging device generally designated by the numeral 12 and which is of the type preferred for use in locations where electrical power is reasonably available to the operator 11. Accordingly, the apparatus may be composed of a tubular member or casing 14 having an electric motor 13 of suitable design mounted at one end, and having a two-string circular housing or rotatable cutting element 15 secured to the shaft of the motor 13. An electrical cable 16 or other suitable conductor may be located in the casing 14 and connected at its lower end to the motor 13. Accordingly, the opposite end of the cable 16 may extend out of the upper or other end of the casing 14 for connection with a suitable source of electric power (not depicted in FIG. 1).

As indicated in FIG. 1, the edging device 12 is preferably provided with upper and lower handles 17 and 18 of suitable design, whereby the device 12 is both portable and manipulatable. Accordingly, the device 12 may be carried, turned, and tilted as desired or required by irregularities in the topography and vegetation growing thereon.

Referring now to FIG. 2, there may be seen a larger and more detailed pictorial representation of the apparatus depicted more generally in FIG. 1. More particularly, the apparatus or vegetation cutter 102 depicted therein may be seen to include a hollow casing 111 or the like with a two-string circular cutting head 104 which is rotated by the shaft of an electrical motor 103 of suitable design mounted at the lower end of the casing 111. As depicted in FIG. 2, the casing 111 may be easily carried and maneuvered by merely a pair of handles 112 and 113 suitably located on the casing 111.

Referring more particularly to FIG. 2, the cutter 102 may be further seen to include a pair of flexible cutting strands 105A and 105B extending laterally from the cutting head 104 through windows 107A and 107B of suitable configuration, a distance which is a function of the present invention as will hereinafter be explained. As further indicated, the housing of the electric motor 103 preferably includes a sleeve portion 109, for receiving and accommodating the lower and insertable dog-leg end of the casing 111, and may further have a circular flange portion or bumper 108 for preventing the cutting head 104 from being brought into injurious contact with a wall or tree during its rotation by the motor 103.

Power may be applied to the motor 103 through a conventional electrical-type insulated cord or conductor 115, having an appropriate plug 116 at one end, and having its other end (not depicted) passed through the casing 111 for connection with the motor 103. An appropriate on-off switch 114 may conveniently be located adjacent the handle 113, at the upper end of the casing 111, for interconnection with the conductor 115 and motor 103. In addition, a knife member 110 is preferably attached to the housing of the motor 103 for trimming the cutting strands 105A and 105B to the proper length, as will hereinafter be explained in detail.

When the motor 103 is inactivated and the rotary body 104 is in a static condition, the two ends of the cutting strand or line 105A and B will limply dangle or flexibly extend from the equally spaced-apart windows 107A and B to the extent permitted by the inherent stiffness characteristics of the material from which the lines are formed. When the rotary body 104 is rotated at normal operating velocites, however, the line ends 105A and B will tend to stand out rigidly (but also yieldably) from the periphery of the rotary body 104 as illustrated in FIG. 2.

The cutting lines 105A and B may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting lines 105A and B should preferably have sufficient fatigue, abrasion, impact resistance, and tensile strength to allow a reasonable service life, and should have as small a diameter as is consistent with the foregoing parameters so that the sharpest cutting edge is provided for effecting cutting of the grass, weeds, or the like. The lines 105A and B should further preferably be as lightweight as possible, so that when the line shears or breaks during use and pieces are thrown from the cutter head 105, such pieces will travel only a limited distance and will strike persons or other objects in the immediate vicinity with little or no appreciable impact.

Effective cutting may be achieved with lines 105A and B formed of a metal, and such lines will also have a greater tensile strength than if formed of nylon or the like. Metallic lines are more subject to breakage because of fatigue, however, and the relatively greater mass of a piece of metal cutting line will cause it to travel like a projectile for a considerable distance. In addition to this dangerous feature, the fact that the greater mass of a metallic line requires a larger heavier motor 103 of greater power makes the use of metallic lines 105A and B undesirable for present purposes. On the other hand, the relatively small mass of a line 105 formed, for example, of an extruded nylon monofilament, creates complex design problems which must be effectively solved to achieve effective cutting of lush vegetation, and this will become even more apparent when it is recognized that only the last one full inch or so, of each of the lines 105A and B, actually impacts against the vegetation sought to be cut.

It has been empirically determined that there is a functional relationship between the weight of the tip (outer one inch) of a cutting line 105, its cross-sectional diameter, its swing radius, and the arcuate velocity of the line 105 at its tip. Thus, an effective length-to-diameter ratio for a nylon monofilament line or the like will often be greater than 30:1, and it has been found that the best cutting lines for the purposes of this invention are extruded nylon line, such as fishing line, having a diameter of about 0.062 inches for cutting grass and about 0.125 inches for cutting weeds.

Although the aforesaid cutting lines are essentially flexible and yielding while in the static condition, they assume a rigid posture under dynamic conditions of rotation, as shown in FIG. 1. The normal rotating speed is on the order of 3000–4000 rpms. During rotation of the cutting lines in the dynamic condition, the cutting lines are caused to become taut and thereby increase the apparent rigidity of the line. These effects are caused by both the rotational speed and the tip speed of the cutting element.

Figure 6:
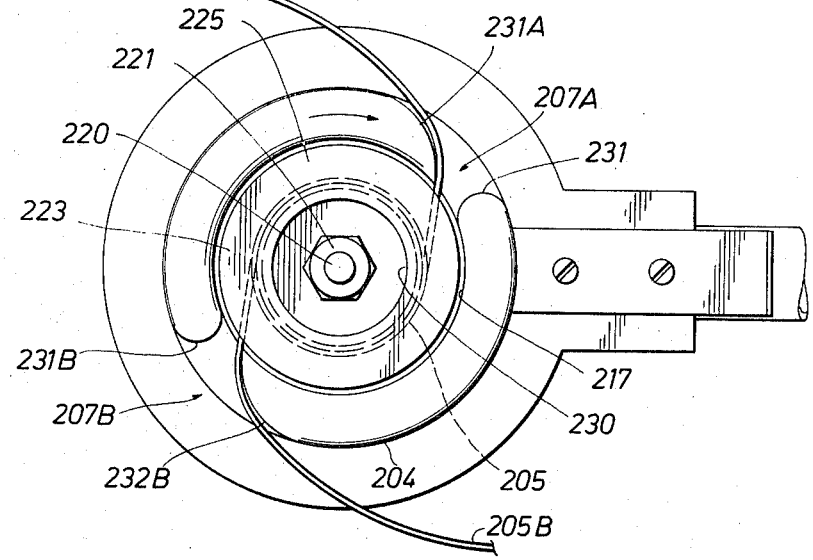
FIG. 6 is another view of the apparatus depicted in FIG. 5.

In operation, the apparatus of FIGS. 1 and 6 is assembled in the condition shown in FIG. 3, with cutting lines 105A and B extending yieldably radially outwardly therefrom to the desired lengths. Thereafter, rotary body 104 is rotated according to the desired rotational speed, whereby as a result, lines 105A and B will extend radially outwardly in a rigid manner from body 104 within its cutting plane, whereby cutting, lawn edging, or the like may be accomplished. As lines 105A and B tend to wear away and become shortened through use, they can thereafter be restored to their original proper cutting length by terminating rotation of rotary body 104, and by unreeling the lines 105A and B to extend them as desired, as will hereinafter be explained in detail.

It will thus be apparent that this invention provides the art with a cutting device which can quickly, easily, and effeciently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can also be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting strings 105A and B act in a resilient fashion, so as not to impart sufficient force to such objects to become missiles; or if they are thrown, they are projected at only a very low velocity as compared with cutting devices heretofore in use. Experience has shown that in operating an apparatus of this device with lines of the type described, the cutting lines may accidentally come in contact with the operator's shoes, articles of clothing, or the like, without serious injury as would be the case with prior art devices. Further, in the event a portion or fragment of the cutting line is thrown from the apparatus, such portions possess low mass and low kinetic energy and, therefore, quickly lose velocity and energy, thus rendering the same virtually harmless.

Referring again to the embodiment of the invention depicted in FIG. 2, and more particularly to the detailed representations contained in FIGS. 2–4, it may be seen that the rotary body 104 may in this instant be a cup-shaped member centrally secured to the threaded end of the motor shaft 120, and properly spaced from the lower side of the dish-like bumper 108 by lock nuts 121 and 122. Thus, a single spool compartment 117 is provided which is readily accessible, since the spool 123 may be removed by merely disengaging the lower lock nut 121.

It may be clearly seen in FIG. 4 that preferably there are two separate cutting ends 105A and B extending in opposite directions from the body of the spool 123, and each through its respective one of the two gaps or windows 107A and B. In the modification therein depicted, adjacent ends of the line 104A and B are passed through an aperture 106 in the spool 123, and then knotted together to prevent disengagement therefrom. The ends 105A and B are then preferably wound together about the spool 123, oppositely of the direction of rotation of the spool 123 and body 104, until they are separated to extend through their respective windows 107A and B, as hereinabove stated.

Referring again to FIGS. 3 and 4, it may be seen that the gooseneck lower end 111A of the casing 111 is releasably secured in the sleeve 109 by a pair of lock screws 109A and B which, in turn, serve to further secure the knife 110 to the underneath side of the sleeve 109 in the proper position to trim the lines 105A and B to the proper length. More particularly, it will be noted that the cutting edge 110A of the knife 110 is positioned to intersect and clip the lines 105A and B as they are revolved in the cutting plane.

The lines 105A and B may be unwound from the spool 123, without removing the spool 123 from the body 104, by drawing them out of their respective windows 107A and B, since the lower flange 125 of the spool 123 is stiff but resilient. The upper flange 124 of the spool 123 is preferably provided with one or more knobs 127–128 for engagement in apertures in the upper side of the body 104, thus preventing rotation of the spool 123 within and independently of the body 104.

It is a particular feature of both embodiments of this invention, as hereinbefore explained, that provision is taken to distribute stress in the cutting lines over as great a length as possible, and this is done by providing that the portions of the lines enclosed within any part of the apparatus are located only adjacent straight or curvilinear surfaces. This is of particular importance insofar as the sidewall portions of the various windows are described, since it has been determined that these surfaces constitute the location of the greatest chance for such kinkage and stress fatigue.

Referring to FIGS. 1–6, it will be seen how the sidewalls of the various windows 107A–B have curvilinear surfaces having radii of substantial magnitude for this reason, and in FIGS. 2–4 the sidewalls 131 and 132 are similarly curved. However, it is of significance that it is the sidewall surface 132A–B which trails the cutting lines 105A–B, which is most important in this regard.

Figure 5:
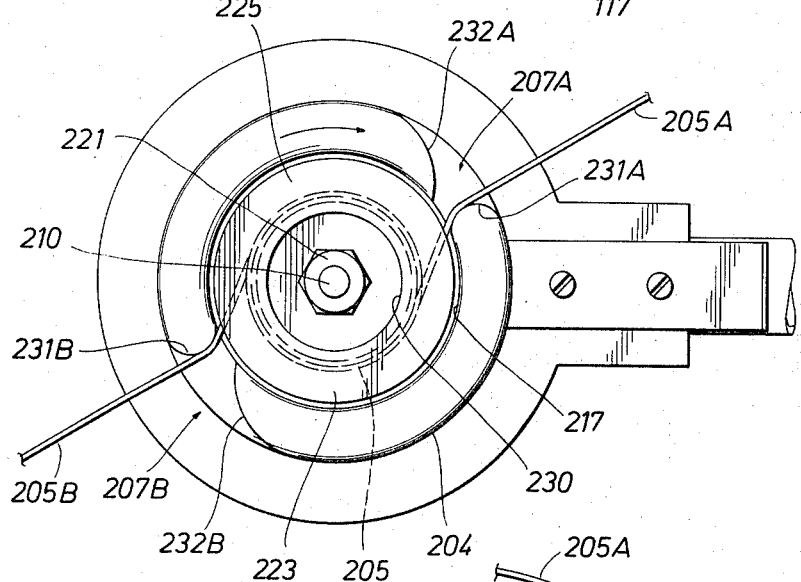
FIG. 5 is a similar pictorial bottom view of a modified version of the apparatus depicted in FIG. 4.

Referring now to FIG. 5, there may be seen a simplified pictorial representation of a modified version of the apparatus depicted in FIGS. 2–4, wherein the lines 205A–B are wound about a spool 223 in the same manner as hereinbefore described. The spool 223 is similarly mounted in the receptacle space 217 in the body 204, and similarly fastened to a motor shaft 220 by a lock nut 221, and the lines 205A–B similarly separate and extend outwardly of the body 204 through windows 207A and B in the wall of the body 204. The significant difference between the body 204 in FIG. 5 and the body 104 in FIGS. 3 and 4 will be readily seen to be the fact that the leading sidewall surfaces 231A–B have a conventional radius of curvature, whereas the trailing sidewalls 232A–B have a much greater radius of curvature. Accordingly, it may be seen in FIG. 6 that whenever either or both of the lines 205A–B are whipped or snapped back about the periphery of the body 204, this increased radius of curvature produces a corresponding curvature in the lines 205A–B, thereby minimizing the bending stresses in the lines 205A–B, and thus minimizing the chances of breakage.

It has been determined that, for the embodiment of the invention depicted in FIGS. 1–6, the optimum parameters will call for nylon lines having diameters of not substantially less than 0.035 inches nor substantially more than 0.100 inches, and a cutting length (the length extending beyond the periphery of the cutting head) of substantially 5–9 inches. In addition, the preferred driving means will be a non-synchronous electric motor capable of maintaining an rpm rate of 3,500–7,000 during normal use of the equipment.

In a more precise relationship, the optimum rpm is preferably stated in terms of tip velocity (since it is the terminal inch of each line that is effective for present purposes), and may thus be stated as follows:

$$V_{min} = 5,600/\sqrt[3]{d} \text{ or } 5,600/d^{0.331}$$
and
$$V_{max} = 21,000/\sqrt[16]{d} \text{ or } 21,000/d^{0.063}$$

wherein V is the tip velocity of the cutting lines in feet per minute, and $d$ is the cross-sectional diameter, in inches, of a monofilament extruded nylon line.

Accordingly, if the line has a diameter of 0.035 inches, the minimum tip velocity should not be less than 17,000 feet per minute, and the maximum velocity should not exceed 26,000 feet per minute. If the line diameter is 0.065 inches, the tip velocites will preferably be between 14,000–25,000 feet per minute, and if the line diameter is 0.100 inches, the tip velocity will be between 12,000–23,000 feet per minute.

As hereinbefore mentioned, the cutting effectiveness is a function of the weight of the lines as well as their tip velocity, and thus it has been determined that in a preferred embodiment of the present invention is depicted in FIGS. 1–6, the lines will be formed of a material having a specific gravity of not substantially less than 0.90 nor substantially greater than 1,60. Since cutting is effected by substantially only the last or furthest inch of each end of the line, it may be stated that the lines should be a dimension such that each line has a kinetic energy of not substantially less than 0.03 foot-lbs., now substantially more than 7.14 foot-lbs., when the equipment is in operation.

It has further been determined that the extended length of the cutting lines is also a direct function of the size of the cutting head, although the precise explanation for this is not immediately apparent. In any event, it can be stated that this provides that the cutting lines should have a free traveling or unsupported length of not substantially less than 0.50 times the diameter of the cutting head, nor substantially more than 2.2 times such diameter, and this appears to be especially significant in the operation of the embodiment of the invention depicted in FIGS. 1–6.

It will be noted that when the apparatus depicted in FIGS. 4–6 are in use, the cutting line ends 105A–B and 205A–B tend to rest only lightly on the adjacent portions 131A–B and 231A–B of the apparatus. Thus, the size of the apertures or windows 107A–B and 207A–B is actually immaterial to the effective operation of the depicted apparatus, and all that is really necessary is to make provisions whereby the lines 105 and 205 will not be thrown off or otherwise unwound from the two spools 130 and 223. On the other hand, it will be apparent that if access to the cutting lines 105 and 205 may only be had through the windows 107A–B and 207A–B, it will be difficult to extend additional line unless the spools 130 and 223 are first disassembled from their respective cutting heads 104 and 204.

Referring again to FIG. 4, it should be noted that the lower flange 125 of the spool 130 is preferably recessed at least slightly within the cavity 117 in the circular cutting head 104, whereby the cutting line ends 105A–B are kept from slipping out of the cavity 117 and then being thrown off of the spool 130 by the rotation of the head 104. The rim of the lower flange 125 will be seen to be located close to, but not actually in contact with the adjacent surface of the head 104, to also prevent the line 105 from slipping out of the cavity 117. However, the lower flange 125 is also sufficiently flexible and resilient whereby it can be bent downward enough to permit unwinding a section of line 105 from around the spool 130. Similarly, the lower flange 225 of the spool 223 depicted in FIGS. 5 and 6 may also be similarly bent out of the head 204 to permit a section of its cutting line 205 to be unwound from the spool 223, without the necessity of disassembling the apparatus.

Figure 7:
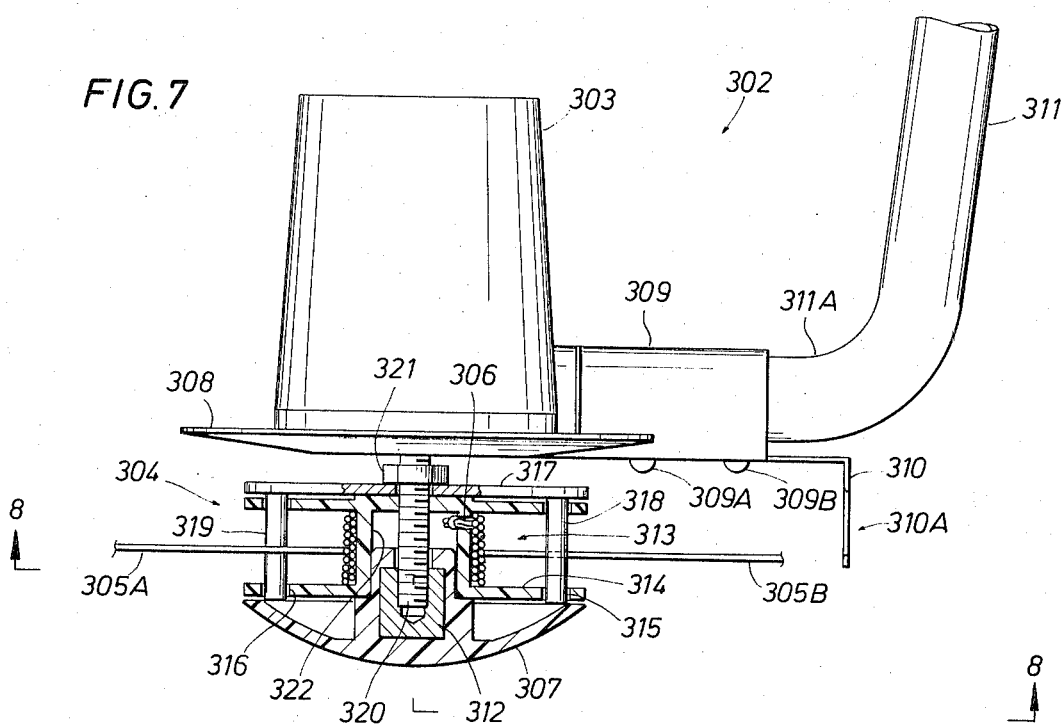
FIG. 7 is a pictorial side view, partly in cross section, of a modified version of the apparatus depicted in FIG. 2.
Figure 8:
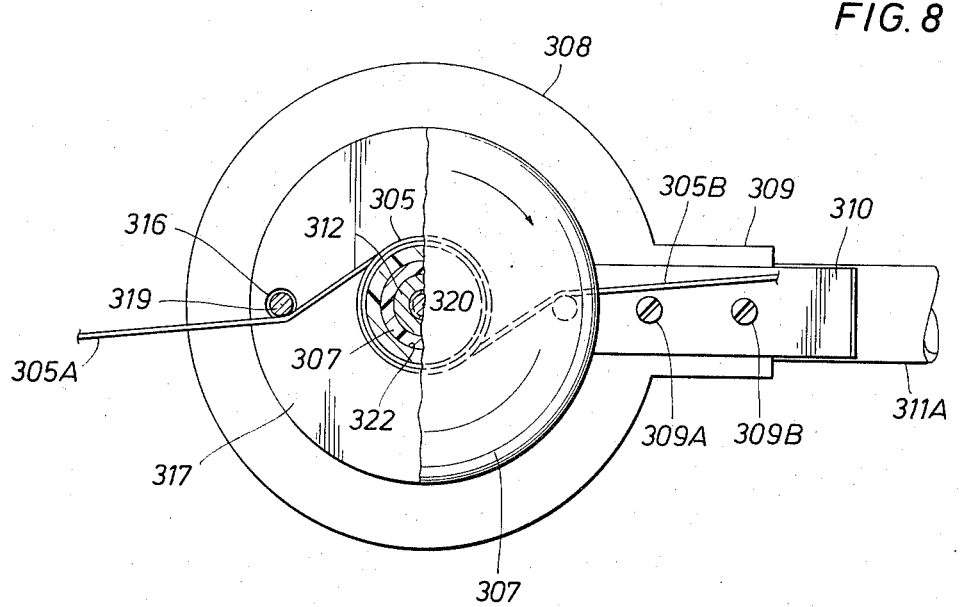
FIG. 8 is a pictorial bottom view, partly cut away, of the apparatus depicted in FIG. 7.

Referring now to FIGS. 7 and 8, there may be seen a modified version of the apparatus represented in FIGS. 3–6, such apparatus 302 including a suitable electric motor 303 mounted on one end of a sleeve 209 in which is slidably inserted the dog-leg end 311A of a tubular handle 311. The shaft 320 of the motor 303 is preferably threaded for the purpose of being fixedly but removably attached to a circular cutting head 304, which preferably rotates concentrically under a dish-like guard or bumper flanges 308 mounted beneath the motor 303 and sleeve 309, and which is also provided with a cutting string 305 having ends 305A and B extending peripherally therefrom at opposite locations about the head 304. Accordingly, rotation of the head 304 will extend the ends 305A and B like flails to cut vegetation adjacent thereto, and if the ends 305A and B are greater than the desired length, they are trimmed by intersecting the cutting edge 310A of a knife 310 slidably secured to the under side of the sleeve 309 by the same set screws 309A and B which may be used to fix the dog leg ends 311A of the handle 311 in the sleeve 309.

Referring again to the cutting head 304 depicted in FIGS. 7 and 8, it may be seen that this assembly is further composed of a circular disc-like member 317 concentrically disposed on the shaft 320, and secured thereto at the proper location by a lock nut 321. Another circular member 313, which is formed by a tubular core portion 322 and a lower flange portion 312, is concentrically mounted on the shaft 320 immediately below the upper circular member 317. It will thus be apparent that the two circular members 313 and 317, when located together in the manner illustrated in FIG. 7, form the equivalent of the spools 130 and 223 depicted in FIGS. 3-6. Accordingly, the cutting line 305 may be inserted through an aperture in the core portion 322 of the lower circular member 313, and then knotted to prevent withdrawal therefrom, and its ends 305A and B may then be wound about such core portion 322 as desired.

Referring again to FIGS. 7 and 8, it will be noted that the flange portion 314 of lower circular member 313 is also provided with a pair of larger apertures 315 and 316 preferably located on opposite sides of the core portion 322 thereof. Further, the upper circular member 317 is provided with a pair of downwardly extending pins 318 and 319 which are preferably located so as to match the two apertures 315 and 316. Accordingly, when the two circular members 313 and 317 are mated to form a spool-like assembly as hereinbefore explained, pins 318 and 319 will extend into apertures 315 and 316, respectively, to prevent rotation of either of the two circular members 313 and 317 independently of the other.

Referring again to FIG. 7, it will be noted that the apparatus 302 illustrated therein may also be provided with a cup-like member hereinafter referred to as the glide ball 307, which has a rounded or semi-ellipsoidal undersurface, and which may be provided with a retainer nut 312 suitable for threaded engagement with the shaft 320 of the motor 303. The retainer nut 312 is preferably embedded or otherwise fixed in the glide ball 307 as indicated in FIG. 7, whereby the glide ball 307 and lock nut 312 will cooperate to secure the two circular members 313 and 317 together to form the aforementioned spool for holding the cutting line 305, and whereby the glide ball 307 may be unscrewed from the shaft 320, and the lower circular member 313 may be removed whenever it becomes necessary to replace the cutting line 305 in its entirety.

As indicated in FIG. 1, the edging apparatus 12 is intended to be carried above the ground by the operator 11, and it is not advantageous to permit any part of the apparatus other than the ends of the cutting line 16 to touch the ground during rotation of the cutting head 15 by the motor 13. Apparatus 302 of the type depicted in FIGS. 7 and 8 is also designed to be normally held above the ground during use. Accordingly, the rounded configuration of the glide ball 307 will permit the apparatus to rest on the guide during rotation, without interference with the cutting effectiveness of the ends 305A and B of the cutting line 305.

Referring now to FIG. 8, it will be noted that the end 305A of the cutting line 305 rests against the pin 319 during normal operation of the apparatus 302. If it snags, however, and is whipped back around the spool in the manner illustrated in FIG. 6, it will be noted that the line end 305A will be provided with a curvature having a relatively larger radius than even the curvature indicated with the apparatus depicted in FIG. 6, and this will further reduce the changes of breakage in the cutting line 305.

Referring again to FIG. 4, it will be noted that the uncoiled line ends 105A and B both lie entirely within the cutting plane during rotation of the head 104. The end 105A extends tangentially from the coiled portion of the line 105 to the bearing surface 131A, and thereafter extends radially from the housing 104 in the cutting plane, but this single deformity in the line end 105A is not sufficient to seriously concentrate the force of impacts at any single point along the length of the line ends 105A, especially since it trails the surface 131A. Furthermore, if retardation or backlash of the line 105A does occur, it will be noted that the line end 105A will first be moved out of engagement with the preceding surface 131A before it engages the trailing surface 132A abd other portions of the cutting head 104. These features are present in like manner with respect to the other line end 105B, of course, as well as in the apparatus depicted in FIGS. 5-8.

It should be understood that, regardless of the particular configuration of any of the various forms of the particular invention, the free traveling end of any cutting line will preferably be swung in the cutting plane at a tip velocity such that such end will tend to stand rigidly out from the periphery of the cutting head. Hence, the line end will experience a shock whenever the line end impacts any object in the cutting plane, and also whenever the free traveling end is caused to whip or backlash about the periphery of the cutting head. The magnitude of this shock will, of course, be affected substantially by whether the impacted object is yielding or unyielding, and whether it is severable. Hence, when the cutting lines have tip velocites within the ranges hereinbefore prescribed, and when they strike an unyielding and unseverable object such as a fence or wall or the like, the resulting shock is sufficiently great to cause breakage if concentrated at one point along the lines.

As hereinbefore explained, it is a feature of each of the embodiments of the invention depicted herein to provide that the shock of such impact be distributed as much as possible along the length of the cutting line, since concentration of such shock at any point will greatly enhance the changes that the cutting line will experience fracture or breakage. Accordingly, provision is made whereby the extended portion of the cutting lines extend along a path lying only in the cutting plane, and whereby provision is made for distribution of such shock along as great a portion of the cutting line as possible. In particular, provision is made whereby the cutting line does not contact any trailing portion of the cutting head during rotation, and whereby it abuttingly contacts only a leading portion of the head. Thus, if the line strikes an unyielding object the line will be least momentarily be pushed back out of contact with this leading portion of the cutting head, and since the line is momentarily out of contact with any adjacent portion of the apparatus the shock will tend to be distributed over a greater portion of the length of the impacted cutting line.

If the impact is great enough, or if the impacted object is so unyielding as to cause the line to backlash about the periphery of the cutting head, then the extended portion of the cutting line will then be contacted by one or more trailing surfaces or other portions of the revolving cutting head. The line will then experience a shock while contacting this trailing portion of the cutting head, if the line strikes another object while still deformed. If the contacted trailing portions of the head have a sufficiently large radius of curvature, however, the chances are improved that the shock will be distributed enough to avoid or minimize damage to the line.

If the line is backlashed about the periphery of the cutting head, of course, the line will not then strike any object in the cutting plane except the head itself. The shock from the backlash will, however, often cause line breakage unless provision is made in one or more of the ways hereinbefore discussed whereby such backlash is about a surface or surfaces having at least a minimum radius of curvature, and whereby the shock of impact is thereby distributed over as much of the length of the line as is possible. In any event, it is exceedingly desirable if not absolutely essential that the line not be permitted to experience any angular deformation at any point along its length.

It will be apparent from the foregoing that many other variations and modifications may be made in the structures and methods described herein without substantially departing from the essential concept of the present invention. Accordingly, it should be clearly understood that the forms of the invention described herein and depicted in the accompanying drawings, are exemplary only and are not intended as limitations in the scope of the present invention.

What is claimed is:

1. Apparatus for cutting vegetation and the like comprising
    head means rotatable in a cutting plane and having a concentrically located spool-like storage portion and a peripherally located support portion having a curvilinear bearing surface in and substantially perpendicular to said plane and spaced from the axis of rotation of said head means,
    electrically actuated driving means for rotating said head means in said plane and about said axis, and
    a flexible non-metallic line member with a cross-sectional diameter at least 0.035 inches and not greater than 0.100 inches in magnitude and having a portion coiled in said storage portion of said head means and further having an uncoiled portion initially extending tangentially from said coiled portion in said cutting plane to and across said bearing surface and further continuing radially outwardly from the periphery of said head means,
    said uncoiled portion of said line member further partially bearing on said bearing surface during rotation of said head means for forming in said cutting plane a free traveling cutting end section having a length functionally related in magnitude to the cross-sectional diameter of said line member.

2. The apparatus described in claim 1, wherein said driving means includes an electric motor with a shaft portion rotating said head means in said cutting plane at a velocity such that the tip velocity of said free traveling cutting end is substantially at least $5,600/\sqrt[3]{d}$ feet per minute and substantially not greater than $21,000/\sqrt[16]{d}$ feet per minute, wherein $d$ is the cross-sectional diameter in inches of said line member.

3. The apparatus described in claim 2, wherein said electric motor is a non-synchronous AC-motivated electric motor rotating said head means at an angular velocity of not substantially less than 3,500 revolutions per minute and not substantially greater than 7,000 revolutions per minute during cutting of vegetation and the like by said free traveling cutting end of said line means.

4. The apparatus described in claim 3, wherein said coiled portion of said line member receives and curvilinearly supports at least a portion of said free traveling cutting end during retardation of said cutting end.

5. The apparatus described in claim 3, wherein said support section of said head means is further provided with another curvilinear bearing surface spaced in said plane from the other such surface and further trailing and normally spaced from said free traveling cutting end during rotation of said head means in said cutting plane,
    said another surface being further located to engage and curvilinearly support said free traveling cutting end during retardation of said end by intersected vegetation and the like.

6. The head means described in claim 5, further comprising
    a circular housing rotatable in said cutting plane by said motor and having an internal concentric storage compartment openable oppositely of said motor and at least one peripheral aperture defined by said line bearing surfaces and communicating with said compartment, and
    spool means insertable in said compartment and holding said coiled portion of said line member in said cutting plane and aligned with said rotation axis and said uncoiled portion extended tangentially from said spool means in said cutting plane to said peripheral aperture and radially outwardly from said peripheral aperture in said housing,
    said uncoiled portion further trailing and bearing on said other surface and spaced from and leading said another surface for forming said free traveling cutting end during rotation of said housing and spool means by said motor.

7. The apparatus described in claim 6, wherein said housing has another similar peripheral aperture located opposite of said first mentioned peripheral aperture and communicating with said compartment and similarly defined by another pair of line bearing surfaces spaced in said cutting plane from the axis of rotation of said housing, and
    wherein said line member has another uncoiled portion extending in said cutting plane tangentially said spool means to and radially outwardly from said another peripheral aperture in said housing,
    said another uncoiled portion of said line member further trailing and bearing on one of said another pair of line bearing surfaces and leading and spaced from the other of said another pair of surfaces to provide another free traveling cutting end having a length in said plane functionally related to the cross-sectional diameter of said line member during rotation of said housing and spool means by said motor.

8. The apparatus described in claim 7, wherein the cross-sectional diameter of said line member is substantially 0.035 inches and said tip velocity is greater than 17,000 feet per minute but not greater than 26,000 feet per minute.

9. The apparatus described in claim 7, wherein the cross-sectional diameter of said line member is substantially 0.065 inches and said tip velocity is greater than 14,000 feet per minute but not greater than 25,000 feet per minute.

10. The apparatus described in claim 7, wherein the cross-sectional diameter of said line member is substantially 0.100 inches and said tip velocity is greater than 12,000 feet per minute but not greater than 23,000 feet per minute.

11. The apparatus described in claim 7, wherein said trailing surface of each peripheral aperture has a greater radius of curvature than said leading surface of each such aperture.

12. The head means described in claim 5, further comprising
 a spool-like member for supporting the coiled portion of said line member and having a central aperture for accommodating the shaft portion of said motor,
 a semi-ellipsoidal member detachably connected with the end of said shaft portion of said motor, and
 pin-like means fixedly interconnected with said shaft portion of said motor and the periphery of said spool-like member by said semi-ellipsoidal member and having at least one line bearing surface at said periphery spaced in said cutting plane from said shaft portion and leading and abuttingly engaging the uncoiled portion of said line member for forming in said cutting plane a free traveling cutting end extending from said surface a distance functionally related to the cross-sectional diameter of said line member during rotation of said spool-like means in said cutting plane.

13. As a subcombination,
 a circular head member rotatable in a cutting plane and having spaced-apart curvilinear bearing surfaces arranged perpendicular to said cutting plane about the periphery of said head member, and
 a flexible non-metallic line member having a coiled portion interconnected with and arranged concentrically in said head member and further having a free traveling end portion lying in said cutting plane and extending outwardly of the periphery of said head member from between said bearing surfaces,
 said bearing surfaces each having a radius of curvature at least great enough to support a section of said free traveling end portion of said line member against angular deformation in said cutting plane,
 said supported section of said free traveling end portion further normally abutting against the bearing surface leading said end portion during rotation of said head member and being normally spaced forwardly away from the bearing surface trailing said end portion during such rotation.

14. A subcombination described in claim 13, wherein said coiled portion of said line member is wound about the rotation axis of said head member in opposition to said rotation of said head member.

15. The subcombination described in claim 14, wherein said trailing one of said bearing surfaces is further formed to provide a greater radius of non-angular curvature to said free traveling end portion of said line member upon abutting said end portion thereof than that provided by said leading one of said bearing surfaces.

16. The subcombination described in claim 15, wherein said trailing one of said curvilinear bearing surfaces has a radius of curvature substantially the same as the radius of curvature of said leading one of said surfaces.

17. The subcombination described in claim 15, wherein said trailing one of said curvilinear bearing surfaces has a radius of curvature substantially greater than the radius of curvature of said leading one of said bearing surfaces.

18. The subcombination described in claim 13, further comprising
 a spool-like member removably insertable concentrically in said head member for supporting said coiled portion of said line member in said cutting plane.

19. The subcombination described in claim 18, wherein said spool-like member is rotatable with said head member as a unit and is non-rotatable within and independently of said head member.

* * * * *

UNITED STATES PATENT OFFICE
CERTIFICATE OF CORRECTION

Patent No. 3,859,776   Dated January 14, 1975

Inventor(s) George C. Ballas and Thomas N. Geist

It is certified that error appears in the above-identified patent and that said Letters Patent are hereby corrected as shown below:

Col. 16, line 20 (claim 16), "15" should read -- 14 -- .

Signed and Sealed this

Twenty-first Day of September 1976

[SEAL]

Attest:

RUTH C. MASON
*Attesting Officer*

C. MARSHALL DANN
*Commissioner of Patents and Trademarks*